US012578154B2

(12) United States Patent
Boudreaux et al.

(10) Patent No.: US 12,578,154 B2
(45) Date of Patent: Mar. 17, 2026

(54) METHODS AND SYSTEMS FOR EVALUATING HEAT EXCHANGERS

(71) Applicant: CHEMTREAT, INC., Glen Allen, VA (US)

(72) Inventors: Kevin Boudreaux, Sioux Falls, SD (US); David Craig Thompson, Carlsbad, CA (US); John R Lewis, North Wales, PA (US); Avish Patidar, Indore (IN); Nicolaas A Van Goor, Edina, MN (US); Timothy S Switzer, Midlothian, VA (US)

(73) Assignee: CHEMTREAT, INC., Glen Allen, VA (US)

( * ) Notice: Subject to any disclaimer, the term of this patent is extended or adjusted under 35 U.S.C. 154(b) by 766 days.

(21) Appl. No.: 17/874,850

(22) Filed: Jul. 27, 2022

(65) Prior Publication Data

US 2024/0035760 A1     Feb. 1, 2024

(51) Int. Cl.
*F28F 27/00*          (2006.01)
*G01K 1/02*          (2021.01)
(Continued)

(52) U.S. Cl.
CPC .............. *F28F 27/00* (2013.01); *G01K 1/026* (2013.01); *G01K 13/02* (2013.01); *G01K 17/06* (2013.01);
(Continued)

(58) Field of Classification Search
None
See application file for complete search history.

(56) References Cited

U.S. PATENT DOCUMENTS 5,005,351 A * 4/1991 Archer ...................... F28B 1/02
                                                            706/915
7,455,099 B2 * 11/2008 Osborn ................... F28F 19/00
                                                            702/182
(Continued)

OTHER PUBLICATIONS

"Omni Analytics Condenser Performance." Omni-Condenser-Analytics, https://www.ecolab.com/offerings/omni-condenser-analytics, archived by the Way Back Machine on Oct. 26, 2020.
(Continued)

*Primary Examiner* — Paul B Yanchus, III
(74) *Attorney, Agent, or Firm* — Oliff PLC

(57)          ABSTRACT

Systems and methods are provided for evaluating performance of a heat exchanger, such as a condenser, using rules-based logic. A plurality of sensors can measure various operating properties of the heat exchanger and transmit corresponding measurement information to a controller. The controller can (i) evaluate the measurement information for a plurality of rules in which each rule considers an operating parameter of the heat exchanger that is based on the measurement information to provide a set of operating values; (ii) compare the set of operating values to a rules matrix in which each of a plurality of possible diagnoses for the heat exchanger are associated with a corresponding set of predetermined values from a set of the plurality of rules; and (iii) based on the comparison, determine at least one likely diagnosis for the heat exchanger from among the plurality of possible diagnoses.

27 Claims, 4 Drawing Sheets

(51) Int. Cl.

| | |
|---|---|
| *G01K 13/02* | (2021.01) |
| *G01K 17/06* | (2006.01) |
| *G01K 17/10* | (2006.01) |
| *G01N 25/18* | (2006.01) |
| *F28B 11/00* | (2006.01) |

(52) U.S. Cl.

CPC ............. *G01K 17/10* (2013.01); *G01N 25/18* (2013.01); *F28B 11/00* (2013.01); *F28F 2200/00* (2013.01)

(56) References Cited

U.S. PATENT DOCUMENTS

| | | | |
|---|---|---|---|
| 2017/0203975 A1 | 7/2017 | Kamen et al. | |
| 2017/0336091 A1 | 11/2017 | Arensmeier et al. | |
| 2018/0373822 A1* | 12/2018 | Poux ....................... | G06F 30/20 |
| 2019/0145722 A1 | 5/2019 | Myers et al. | |
| 2019/0301308 A1 | 10/2019 | Sekine et al. | |
| 2019/0344214 A1 | 11/2019 | Friesen et al. | |

OTHER PUBLICATIONS

"Suez Unveils New Empower Digital Advanced Analytic to Improve Steam Condenser Performance." SUEZ Water—Water Technologies & Water, Dec. 9, 2020, https://www.watertechnologies.com/about-us/newsroom/suez-unveils-new-empower-digital-advanced-analytic-improve-steam-condenser.

Aug. 11, 2023 Search Report issued in International Patent Application No. PCT/US2023/21699.

\* cited by examiner

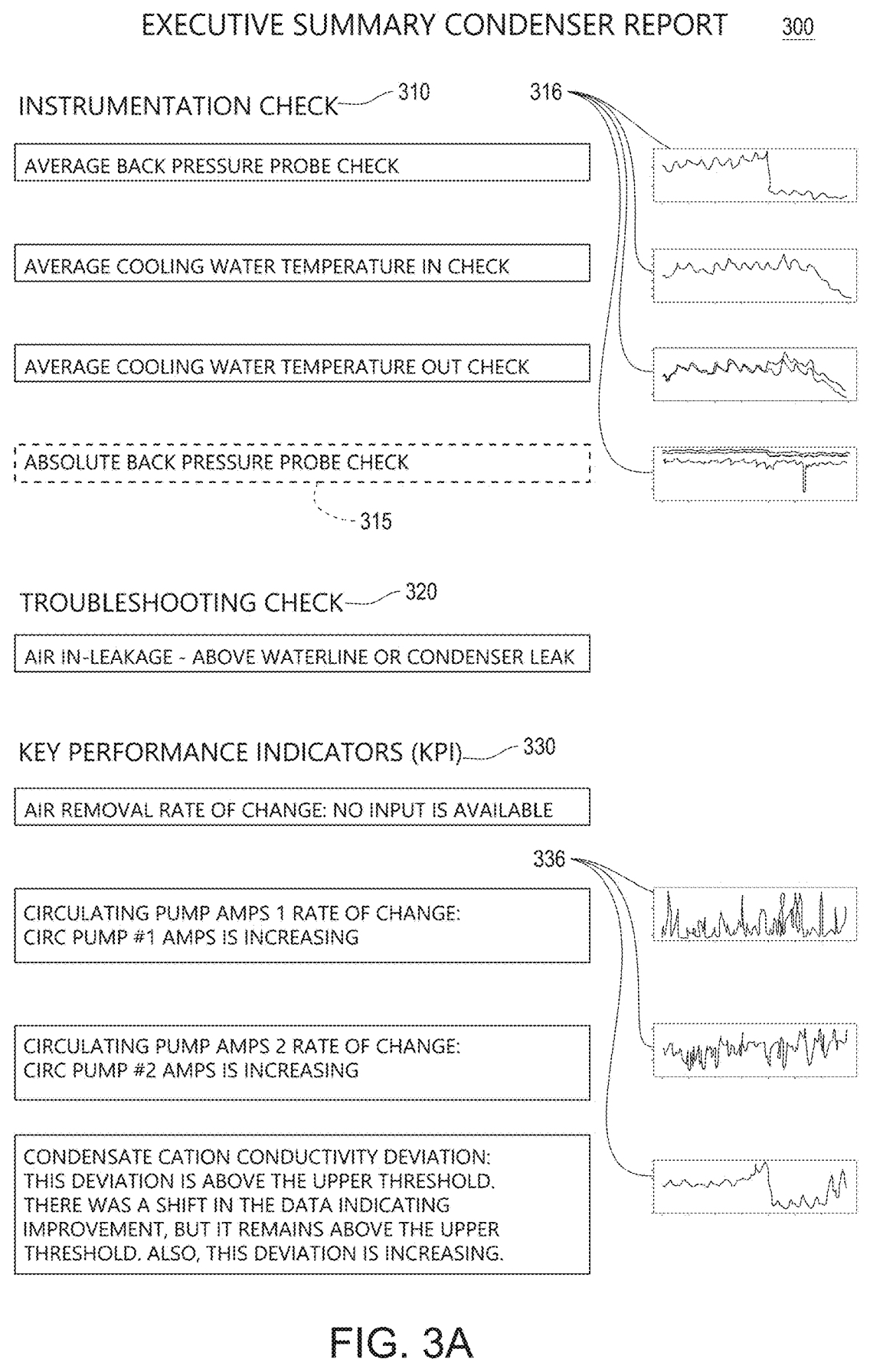

EXECUTIVE SUMMARY CONDENSER REPORT    300

INSTRUMENTATION CHECK 310        316

AVERAGE BACK PRESSURE PROBE CHECK

AVERAGE COOLING WATER TEMPERATURE IN CHECK

AVERAGE COOLING WATER TEMPERATURE OUT CHECK

ABSOLUTE BACK PRESSURE PROBE CHECK

315

TROUBLESHOOTING CHECK 320

AIR IN-LEAKAGE - ABOVE WATERLINE OR CONDENSER LEAK

KEY PERFORMANCE INDICATORS (KPI) 330

AIR REMOVAL RATE OF CHANGE: NO INPUT IS AVAILABLE

336

CIRCULATING PUMP AMPS 1 RATE OF CHANGE:
CIRC PUMP #1 AMPS IS INCREASING

CIRCULATING PUMP AMPS 2 RATE OF CHANGE:
CIRC PUMP #2 AMPS IS INCREASING

CONDENSATE CATION CONDUCTIVITY DEVIATION:
THIS DEVIATION IS ABOVE THE UPPER THRESHOLD.
THERE WAS A SHIFT IN THE DATA INDICATING
IMPROVEMENT, BUT IT REMAINS ABOVE THE UPPER
THRESHOLD. ALSO, THIS DEVIATION IS INCREASING.

FIG. 3A

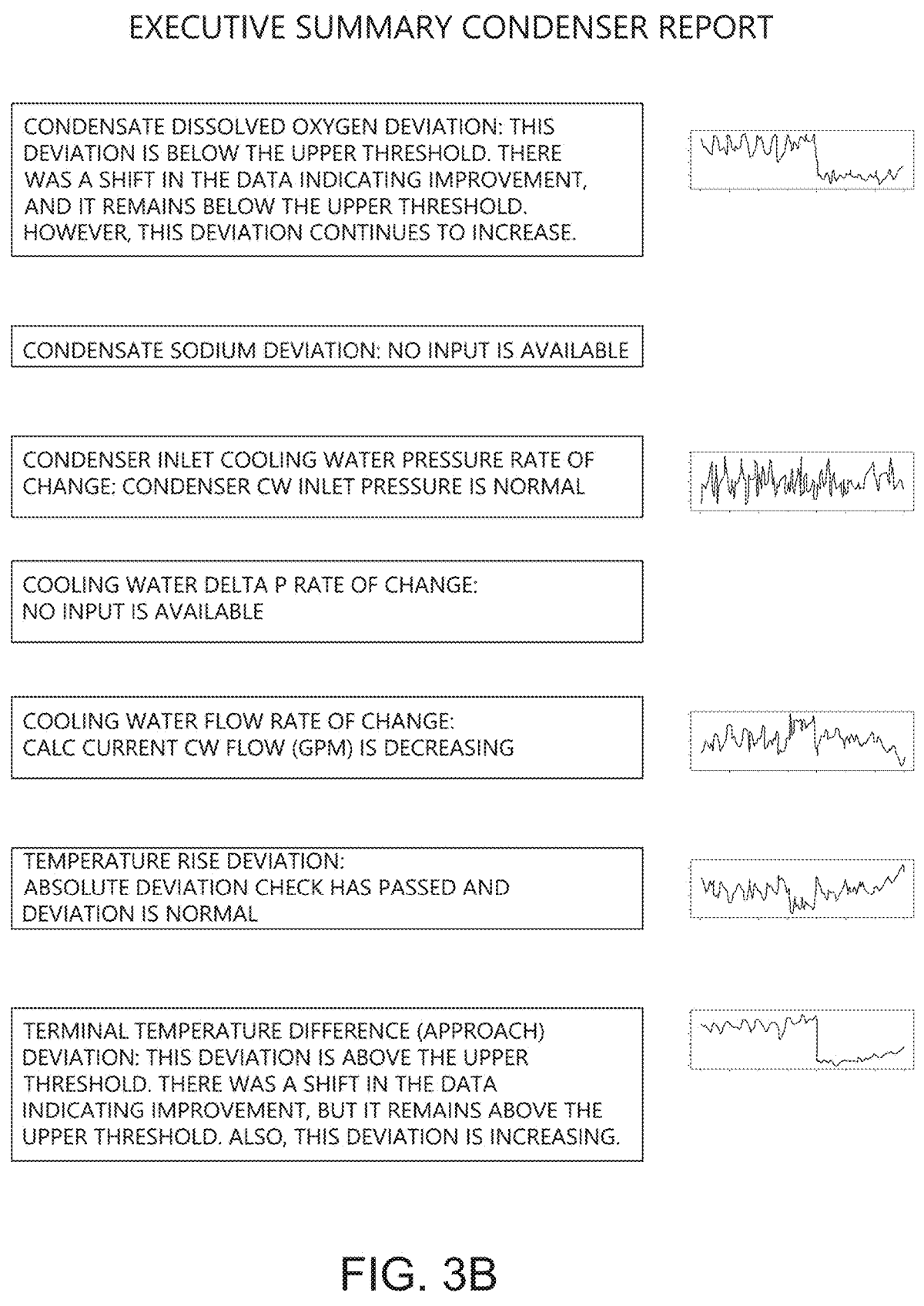

EXECUTIVE SUMMARY CONDENSER REPORT

CONDENSATE DISSOLVED OXYGEN DEVIATION: THIS
DEVIATION IS BELOW THE UPPER THRESHOLD. THERE
WAS A SHIFT IN THE DATA INDICATING IMPROVEMENT,
AND IT REMAINS BELOW THE UPPER THRESHOLD.
HOWEVER, THIS DEVIATION CONTINUES TO INCREASE.

CONDENSATE SODIUM DEVIATION: NO INPUT IS AVAILABLE

CONDENSER INLET COOLING WATER PRESSURE RATE OF
CHANGE: CONDENSER CW INLET PRESSURE IS NORMAL

COOLING WATER DELTA P RATE OF CHANGE:
NO INPUT IS AVAILABLE

COOLING WATER FLOW RATE OF CHANGE:
CALC CURRENT CW FLOW (GPM) IS DECREASING

TEMPERATURE RISE DEVIATION:
ABSOLUTE DEVIATION CHECK HAS PASSED AND
DEVIATION IS NORMAL

TERMINAL TEMPERATURE DIFFERENCE (APPROACH)
DEVIATION: THIS DEVIATION IS ABOVE THE UPPER
THRESHOLD. THERE WAS A SHIFT IN THE DATA
INDICATING IMPROVEMENT, BUT IT REMAINS ABOVE THE
UPPER THRESHOLD. ALSO, THIS DEVIATION IS INCREASING.

FIG. 3B

METHODS AND SYSTEMS FOR EVALUATING HEAT EXCHANGERS

TECHNICAL FIELD

This disclosure relates generally to monitoring and diagnosing operational issues with heat exchangers, and more specifically to automatically monitoring and diagnosing surface condensers.

BACKGROUND

Heat exchangers are used in a wide variety of industries to transfer heat between two or more fluids. Heat exchangers can be used to heat or cool a given fluid, and can be used to cause a phase a change in a fluid. For example, heat exchangers can be used as condensers to condense steam that is used in power generation facilities.

There are various systems that use on-line sensors to monitor heat exchange performance, and report to operators regarding real time properties or parameters of the heat exchanger, e.g., heat exchange efficiency, so that the operators can identify problems with the heat exchanger and make system changes if needed. However, these existing systems merely provide a digital representation of the heat exchanger, and thus provide limited information to the operator.

SUMMARY

In contrast with existing applications, embodiments of the invention can provide an operator with more information by using online sensor data to automatically diagnose a likely cause of issues or events occurring with the heat exchanger.

In one aspect, embodiments of the invention are directed to a system that includes a heat exchanger that is configured to transfer heat between two or more process fluids, a plurality of sensors that are each configured to measure an operating property of the heat exchanger and transmit measurement information that is based on the measured operating property, and a controller. The controller is programmed to (i) evaluate the measurement information for a plurality of rules that each correspond to an operating parameter of the heat exchanger to identify a set of operating values; (ii) compare the set of operating values to a rules matrix in which each of a plurality of possible diagnoses for the heat exchanger are associated with a corresponding set of predetermined values from a set of the plurality of rules; (iii) based on the comparison, determine at least one likely diagnosis for the heat exchanger from among the plurality of possible diagnoses; and (iv) cause information identifying the at least one likely diagnosis to be displayed on a display.

In another aspect, embodiments of the invention are directed to a method for evaluating a heat exchanger including steps of (i) measuring a plurality of operating properties of the heat exchanger with a plurality of sensors to provide measurement data; (ii) using a controller, identifying a set of operating values by evaluating a plurality of rules with the measurement data, in which each of the plurality of rules compares a corresponding operating parameter of the heat exchanger that is based on the measurement data with a threshold value; (iii) using the controller, comparing the set of operating values to a rules matrix in which each of a plurality of possible diagnoses for the heat exchanger are associated with a corresponding set of predetermined values from a set of the plurality of rules; and (iv) based on the comparison, and using the controller, determining at least one likely diagnosis for the heat exchanger from among the plurality of possible diagnoses in the rules matrix.

In another aspect, embodiments of the invention are directed to a non-transitory computer readable medium containing computer-executable instructions that, when executed, cause at least one processor to process measurement information from a plurality of sensors that measure a plurality of operating properties of a heat exchanger. The executed process includes steps of (i) identifying a set of operating values by evaluating a plurality of rules with the measurement information, wherein each of the plurality of rules compares a corresponding operating parameter of the heat exchanger that is based on the measurement information with a threshold value; (ii) comparing the set of operating values to a rules matrix in which each of a plurality of possible diagnoses for the heat exchanger are associated with a corresponding set of predetermined values from a set of the plurality of rules; and (iii) based on the comparison, determining at least one likely diagnosis for the heat exchanger from among the plurality of possible diagnoses in the rules matrix.

BRIEF DESCRIPTION OF THE DRAWINGS

FIG. 3A-3B is a schematic diagram of a report that can be generated based on evaluating a surface condenser.

DETAILED DESCRIPTION OF EMBODIMENTS

The systems and methods described herein can monitor online performance of heat exchangers and automatically diagnose or troubleshoot events, trends, or problems that may occur with the heat exchanger by using rules-based logic. The systems and methods can be applied to heat exchangers in a variety of industries including power generation facilities, steel mills, paper mills, ammonia production facilities, large universities, refineries, etc.

Heat exchangers can be used in these and other industries to transfer heat between two or more fluids. In embodiments, the heat exchanger is an indirect heat exchanger in which the fluids are separated. For example, one or more of the fluids can flow through tubes, plates, or coils that have a relatively high thermal conductivity, such as copper, titanium, aluminum, or steel. The heat transfer can occur by arranging the fluids in countercurrent flow, cocurrent flow, crossflow (i.e., perpendicular), or a hybrid between any two or more of these. Exemplary types of heat exchangers include shell and tube, plate heat exchangers, plate and shell heat exchangers, etc.

In sonic embodiments, the heat exchanger can be a phase-change heat exchanger in which one or more of the fluids undergoes a phase change during the heat transfer process. Examples of phase-change heat exchangers include condensers and evaporators.

Figure 1:
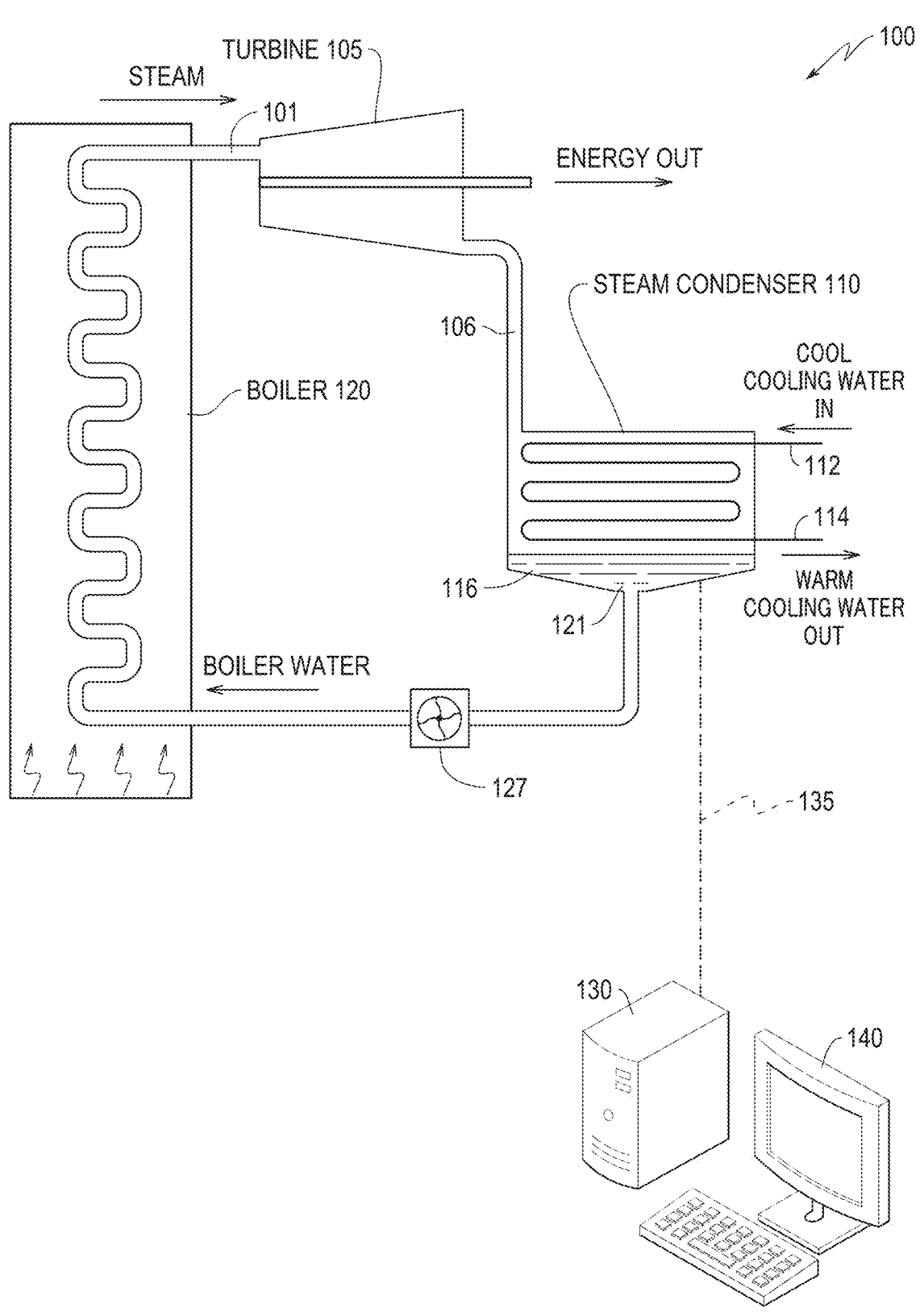
FIG. 1 is a schematic diagram illustrating a system for evaluating a surface condenser in a power generation facility.

FIG. 1 is a schematic diagram showing a condenser monitoring system according to one embodiment of the invention that is used in a power generation facility. The power generation facility 100 includes a steam-drive turbine 105, a surface condenser 110, boiler 120, a computer 130, and display 140.

The turbine 105 is driven by steam 101 to generate power, and then lower pressure steam 106 exits the turbine and is condensed in surface condenser 110, The surface condenser includes cooling water inlet 112 and cooling water outlet 114. The steam 111 condenses and the condensed water 121 is collected in hotwell 116. The condensed water 121 can then be pumped to boiler 120 with pump 127. Heat is applied to the boiler 120 to generate steam 101.

The computer 130 may include a memory and a controller that performs the functions of evaluating the heat exchanger described herein. The controller can include, at least in part, in hardware, software, firmware or any combination thereof. For example, the controller can include one or more processors (e.g., CPU), including one or more microprocessors, digital signal processors (DSPs), application specific integrated circuits (ASICs), field programmable gate arrays (FPGAs), or any other equivalent integrated or discrete logic circuitry, as well as any combinations of such components. The controller can be programmed with software that is stored on a computer-readable medium that causes the controller to process data to evaluate the heat exchanger. The controller can be located at the facility site that includes the heat exchanger, as illustrated in FIG. 1. Alternatively, the controller can be located remote from the heat exchanger facility and can be accessed by a local computer over a network, or the controller can be a geographically distributed cloud-based controller that is accessed by a local computer over a network. The computer-readable medium can include volatile and/or non-volatile memory forms including, e.g., random access memory (RAM), read only memory (ROM), programmable read only memory (PROM), erasable programmable read only memory (EPROM), electronically erasable programmable read only memory (EEPROM), flash memory, a hard disk, a CD-ROM, a floppy disk, a cassette, magnetic media, optical media, or other computer readable media.

The computer 130 can receive sensor signals 135 from a plurality of sensors that measure various parameters of the surface condenser 110. In FIG. 1, the sensor signals 135 are illustrated schematically, but it should be understood that the sensor signals can be communicated to the controller of the computer in various ways, including directly or indirectly, individually or collectively, etc. As explained in greater detail below, the controller can be programed with software that can generate a likely diagnosis of any problems or conditions occurring at the condenser by using information from the plurality of sensors. The controller can generate a report that identifies one or more likely diagnoses, which can be displayed on display 140. An operator of the surface condenser can then take one or more corrective actions based on the diagnosis.

Figure 2:
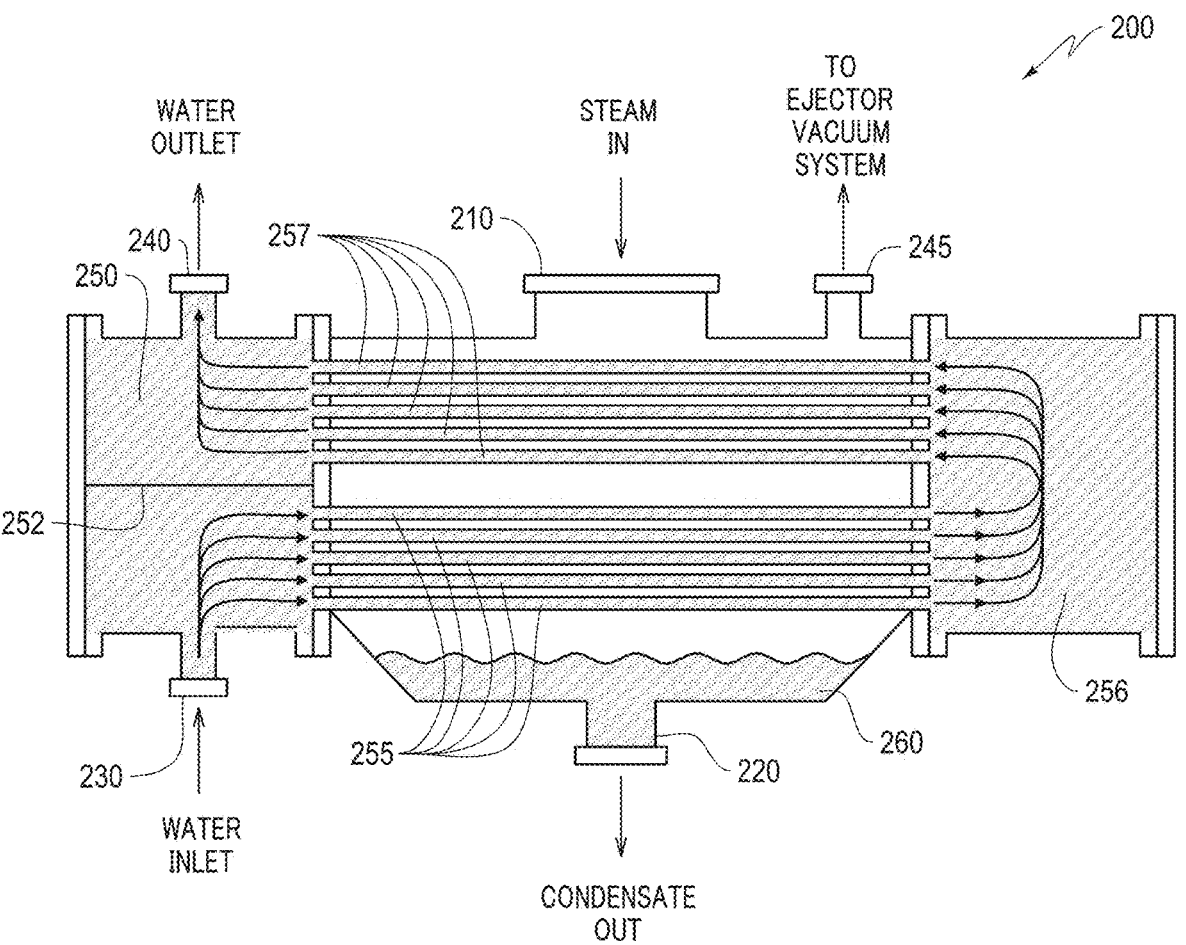
FIG. 2 is a schematic diagram illustrating aspects of an online system for monitoring a surface condenser.

FIG. 2 illustrates a surface condenser 200 that can be monitored and evaluated according to one embodiment of the invention. The surface condenser 200 includes a steam inlet 210, a condensate outlet 220, a cooling water inlet 230, cooling water outlet 240, and air ejector 245. In this case, the surface condenser 200 is a shell and tube type heat exchanger. Cooling water enters the shell 250 at inlet 230 and is directed by baffle 252 through a plurality of tubes 255 that extend through the shell 250. The cooling water then enters water box 256 on the opposite end of the condenser 200 and then is directed through tubes 257. The warmed cooling water exits the condenser 200 at outlet 240. Saturated steam is received from a turbine and enters condenser 200 at steam inlet 210. The steam passes downward over tubes 256, 257, perpendicularly to the direction of flow of the cooling water, and the steam condenses on the surfaces of the tubes. Condensed steam is collected in hotwell 260 and exits the condenser 200 at condensate outlet 220. Air can be removed from the shell 20 at air ejector 245.

According to embodiments of the invention, the systems include a plurality of sensors that measure different properties of the heat exchanger and transmit signals regarding the measurements that can be received by the controller. The sensors can include temperature sensors, pressure sensors, dissolved oxygen sensors, ion sensors (e.g., sodium ion), conductivity sensors, flow rate sensors, pH sensors, oxidation-reduction potential (ORP) sensors, turbidity sensors, etc.

By way of example, in the context of condensers, the sensors can be positioned to measure several properties of the condenser operation including (i) cooling water ("CW") in temperature; (ii) cooling water out temperature; (iii) steam inlet temperature; (iv) condenser back pressure ("BP"); (v) hotwell temperature; (vi) cation conductivity ("CC") of the condensate; (vii) dissolved oxygen ("DO") concentration in the condensate; (viii) sodium concentration in the condensate ("Na"); (ix) cooling water flow rate; (x) steam flow rate; (xi) water box level; (xi) cooling water ORP; (xii) cooling water pH; (xiii) cooling water turbidity; (xiv) air removal rate; and (xv) cooling water pump current used. According to some embodiments, four or more of such properties are measured and used to diagnose the condenser, eight or more properties, or from 10 to 20 properties, for example.

For robustness and redundancy, some of these properties can be measured with multiple sensors. For example, at each measured location in the condenser, there may be two or more of the same sensor type, four or more of the same type of sensors, such as from six to ten sensors. In such cases, the measured values at each location from the several sensors can be averaged.

As explained in greater detail below, the controller is programed to diagnose one or more likely issues or conditions occurring in the heat exchanger based on the sensor data. The controller can also be programmed calculate useful parameters of the heat exchanger using two or more of the measured inputs. In some aspects, the calculated operating parameters can be related to the efficiency of the heat exchanger, e.g., based in particular on temperature sensor data. In the context of condensers, the controller can calculate (i) Delta T of cooling water, also called Temperature Rise ("TR") (i.e., an indication of the BTUs per pound of cooling water gained); (ii) Terminal Temperature Difference ("TTD") (defined as the steam saturation temperature minus the cooling water outlet temperature; the TTD is an indication of the efficiency of heat transfer); and (iii) Delta P or Differential Pressure ("DP") of the cooling water (i.e. the pressure difference between the cooling water inlet and outlet). Additionally, for any of the aforementioned measured or calculated parameters, the controller can calculate a rate of change of the parameter.

In addition to sensor data and operating parameters of the heat exchanger, the controller can be programed to diagnose one or more likely heat exchanger issues based on data taken from sensors located at other parts of the plant/facility operations that may affect the operation of the heat exchanger. For example, in the context of evaluating surface condensers in power plant operations, properties of the boiler system may affect the heat exchanger, such as the boiler temperature, boiler pressure, flue gas flow, fan amps, etc. Additionally, water chemistry data from sensors in other parts of the plant may be relied on to diagnose the heat exchanger. These sensors can include temperature sensors, pressure sensors, dissolved oxygen sensors, ion sensors (e.g., chlorine, silica, sodium ion sensors), conductivity sensors, flow rate sensors, pH sensors, oxidation-reduction potential (ORP) sensors, turbidity, sensors, environmental sensors such as exterior temperatures and rainfall, and the like. Areas that these sensors could take data from include source water intake, system effluent, additive supply tanks such as biocide or scale/corrosion inhibitors, water storage tanks, fuel composition, air and gas parameters, and the like.

In processing the raw sensor data to calculate other operating parameters or to evaluate the rules, the controller may smooth the data using known algorithms to remove or reduce noise and outliers from the data.

The sensors can transmit the measurement signals to the controller over a communication network, including wired or wireless communication. The sensors can take measurements periodically (e.g., once every second to once every hour, or from once every 10 seconds to once every 30 minutes, or from every 5 minutes to 20 minutes, for example), intermittently (including on-demand), or nearly continuously. As indicated above the sensors can send signals to one or more controllers to process the measured data to diagnose the heat exchanger. This allows the system to effectively generate a new specifications sheet for the condenser based on current data and current load conditions (e.g., a reduced turbine load), e.g., to provide accurate ITT), TR, and BP deviations from design conditions, so that the performance of the condenser is evaluated based on actual operating conditions of the condenser.

The controller can use rules-based logic whereby the controller determines whether a possible outcome/diagnosis is likely based on a plurality of predetermined rules relating to an operating condition of the heat exchanger. Each of the rules can compare a measured or calculated parameter of the heat exchanger to a predetermined threshold value (including numerical ranges). In some cases, the threshold values for each rule can be determined empirically for a specific heat exchanger or a specific facility, for example. In some embodiments, the evaluation of the heat exchanger parameter with the rules creates binary values, e.g., H ("high") if the parameter is above a threshold or N ("normal") if the parameter is below a threshold. To diagnose a likely event in the heat exchanger, the controller evaluates measured/calculated parameters of the heat exchanger for several evaluation rules, e.g., at least 4 rules, at least 10 rules, at least 15 rules, or from 10 to 30 rules. This evaluation provides a set of operating values associated with the current state of the heat exchanger. Additionally, one or more of the rules can be compare a measured or calculated parameter that relates to an operating property of the facility apart from the heat exchanger, but which ultimately affects the heat exchanger. In such cases the set of operating values can include corresponding values that are based on sensor data from sensors located at other parts of the facility and not part of the heat exchanger system.

The controller can access a rules-based engine that associates each of several possible outcomes/diagnoses of the heat exchanger with a set of predetermined values from a set (typically a subset) of the aforementioned evaluation rules. For example, each possible outcome can be associated with a set of predetermined values from 3 to 20 of the evaluation rules, at least 5 of the rules, from 5 to 15 of the rules, or from 8 to 12 of the rules. To illustrate, one possible outcome can be associated with 6 predetermined values from 6 of the rules, e.g., H, H, H, N, H, N. In this way, the rules-based engine can include several possible predetermined outcomes that are each associated with a unique set of predetermined values from a set of several rules. The rules-based engine can be stored in a memory.

The controller can be programmed to evaluate the operational parameters of the heat exchanger from the measured data by using the plurality of rules to obtain the set of operating values. The controller can be programmed to then compare the operating values to the set of predetermined values in the rules-based engine to determine at least one likely predetermined outcome relating to the heat exchanger operation. In some embodiments, the controller determines only one likely predetermined outcome. The controller can determine that a possible outcome in the rules engine is likely if the results from the evaluation of the measured/calculated parameters (i.e., the set of operational values) match at least 80% of the set of predetermined values for a given possible outcome in the rules engine, at least 90% of the set of the predetermined values for a given possible outcome in the rules engine, or 100% of the set of the predetermined values for a given possible outcome in the rules engine. Additionally, in some embodiments, a scaling or weighting factor can be applied to one or more of the rules in determining a likely outcome/diagnosis.

An example of a portion of a rules engine (also called a "rules matrix") for a surface condenser is illustrated in Table 1 below. As can be seen, the rules-based engine is set up as a matrix in which each row corresponds to a possible outcome/diagnosis and each column (except the first column) corresponds to a different rule. This matrix is set as a 5×18 matrix, in which each of 5 possible outcomes/diagnoses is associated with predetermined results from a set of rules. A full rules engine will likely have more than the exemplified 5 possible outcomes/diagnoses, but they would be of a similar nature. In this case, there are 17 rules that the controller evaluates, although most of the outcomes are not associated with all 17 rules. In Table 1 "N/A" means that information from the operational parameter is not available (although this fact can be used as part of the diagnosis of the heat exchanger), and "--" means that the rule is not considered for the possible outcome. The seventeen rules in this case each constitute a comparison of a parameter of the condenser (the abbreviations are identified above) with a threshold value. In this case, the parameters are either directly measured properties of heat exchanger (e.g., CC, DO, Na), calculated values from measured operating properties (e.g., TTD, TR), or rates of change of the foregoing parameters.

A given outcome or event can be associated in the rules engine with multiple sets of predetermined values (i.e., from different subsets of the evaluation rules). In this regard, the same event of the surface condenser can be associated with different predetermined results, e.g., Oxygen Ingress may be an event that is associated with several different predetermined results from a set of rules or from different sets of rules. For surface condensers, the following possible outcomes may be identified: Air In-Leakage; Air In-Leakage Above Waterline or Condenser Leak, Air In-Leakage Above the Waterline; Air In-Leakage Below the Waterline; Air In-Leakage Below the Waterline or Excess Demin (i.e., demineralized water) Makeup to the Hotwell; Air In-Leakage Related to Condenser Leak; Circulating Pump Related Issue; Circulating Pump Related Issue—Cavitation; Circulating Pump Related Issue-Pump Wear; Circulating Water Flow Resistance; Decrease in Circulating Water Flow; High Heat Rejection; Macro Fouling or Vacuum Priming Issue No Condenser Performance Issues Noted; Oxygen Ingress; Possible Air In-Leakage Below the Waterline, Excess Demin

7

Makeup, Waterside Fouling; Possible Condenser Leak, Denim Contamination, Air In-Leakage; Suspected Condenser Leak or Denim Contamination; Suspected Organic Contamination; and Suspected Waterside Fouling—Bio, Silt, Scale.

In the Table 1 example, the controller can be programmed to evaluate the measured operating data of the surface condenser for all 17 of the rules, and then compare the operating values with the rules matrix. In this example, if the operating values are a 100% match with a set of predetermined results from the rules matrix, the controller determines that the outcome associated with the set of predetermined results is a likely outcome. The controller can then output signals causing a display to display the likely outcome/diagnosis to an operator. Likewise, as shown in Table 2 below, each outcome can be associated (e.g., in a memory) with a predetermined message ("Deliverable"), which provides a more detailed explanation of the diagnosis and optionally guidance to the operator regarding how to correct or check potential problems. The controller can likewise cause the display to display the predetermined message.

TABLE 1

| Outcome | TTD | TTD rate of change | TR | TR rate of change | CC | CC rate of change | DO | DO rate of change | Na | Na rate of change |
|---|---|---|---|---|---|---|---|---|---|---|
| (1) Air In-Leakage Related to Condenser Leak | H | H | N | N | H | H | — | — | H | H |
| (2) Circulating Water Flow Resistance | N | N | H | H | N/A | N/A | N/A | N/A | N/A | N/A |
| (3) High Heat Rejection | H | H | H | H | N/A | N/A | N/A | N/A | N/A | N/A |
| (4) Oxygen Ingress | N | N | N | N | N | N | H | H | N | N |
| (5) Possible Condenser Leak, Demin Contamination, Air In-Leakage | N | N | N | N | H | H | N | N | — | — |

| Outcome | CW inlet P Rate of change | CW Flow Rate of Change | Circ Pump Amps Rate of Change | Steam Flow relative to Design Spec | CW DP | CW DP rate of change | Air Removal Rate of Change |
|---|---|---|---|---|---|---|---|
| (1) Air In-Leakage Related to Condenser Leak | N/A | N/A | N/A | N/A | N/A | N/A | — |
| (2) Circulating Water Flow Resistance | — | N | N/A | N | H | H | N/A |
| (3) High Heat Rejection | N | N | N/A | H | — | — | N/A |
| (4) Oxygen Ingress | N/A | N/A | N/A | N/A | N/A | N/A | N |
| (5) Possible Condenser Leak, Demin Contamination, Air In-Leakage | N/A | N/A | N/A | N/A | N/A | N/A | — |

TABLE 2

| Outcome | Deliverable |
|---|---|
| (1) Air In-Leakage Related to Condenser Leak | Based on the data, it appears there is a condenser leak. This is suspected due to the increase in TTD Deviation, condensate CC, and condensate sodium. There is no data pertaining to air removal rates, so there is no way to correlate or confirm. Because condensate CC and sodium are rising, it suggests there could be a significant condenser leak. If the plant monitors condensate silica, see if that correlates with the sodium as well. If it does, this is further confirmation there is a condenser leak. This is a critical situation since the contamination from the condenser leak can cause detrimental effects on the boiler chemistry. If the pH has dropped below 8.0, due to the ingress of hardness and acidic anions, the plant needs to take the boiler offline and flush out the system with demin quality water. |
| (2) Circulating Water Flow Resistance | Based on the data, there appears to be a flow related issue. The increasing condenser water DP is a strong indication there is a flow obstruction in the condenser. |
| (3) High Heat Rejection | Based on the data, it appears the plant is just overloading the condenser, i.e. sending too much steam to it. Furthermore, the Inlet CW pressure is normal, indicating there is not a flow related issue (i.e. macrofouling). However, there is no Delta P to confirm. The modeling program usually takes this into consideration, but every now and then you will see this phenomenon. The elevated TTD, TR and above design steam loading all point to overrunning the condenser. |
| (4) Oxygen Ingress | Based on the data, there appears to be oxygen intrusion into the system. It is important to confirm the instrumentation, but assuming it is functioning properly, oxygen is entering the system. The condensate CC and Na are normal, suggesting a condenser leak is not responsible for this intrusion. Air Removal Rate is normal indicating it is not air related, but it is always possible there is a very small air in-leakage event occurring, small enough to contribute to condensate DO but not affect TTD Penalty. For air ingress, the most effect means of troubleshooting is a helium leak detection study. These are performed by companies that specialize in condenser leak detection. Common areas to look are penetrations below the water line, the steam trap drains off steam jet air ejector inter- and aftercoolers, and the drain from the first LP heater in conventional plants. However, in this particular instance, the excess condensate DO may be due to excessive |

TABLE 2-continued

| Outcome | Deliverable |
| --- | --- |
| | makeup rates, which is further suggested by the consistent Air Removal rate. If the demin makeup (in lbs/hr) exceeds 5% of the total steam flow, it can lead to an increase in condensate DO. |
| (5) Possible Condenser Leak, Demin Contamination, Air In-Leakage | Based on the data, the condenser seems to be performing as expected. The elevated condensate cation conductivity suggests there may be a small condenser leak, demin makeup contamination, or organic issue. There is no condensate sodium, so it is difficult to confirm a condenser leak or demin makeup contamination. Check condensate and demin silica levels, as this may shed more light on what is taking place. Also, there is no air in-leakage data, and there is the very real possibility that the elevated condensate cation conductivity is due to air in-leakage above the waterline. As a gauge, condenser leaks and demin contamination generally cause a depression in the drum (HP for HRSGs) pH, while organics cause a depression in the drum if the pressure is at or below around 600 psi. Air in-leakage typically does not affect any drum pHs. |

The controller can also be programmed to evaluate the measured data to perform an instrumentation check of each of the sensors, which can verify data quality, and highlight any issues with the sensors, and determine if any of the sensors is likely providing aberrant data. In particular in the context of condensers, the probes used to measure temperatures and condenser back pressure can provide inaccurate readings if they are positioned or installed incorrectly or if they have not been calibrated correctly. As indicated above, for many of the measured parameters there are multiple sensors. Accordingly, in one embodiment, as an instrumentation check, the controller can determine an average of all of the measurement data from the sensors used to measure a particular parameter, as well as a standard deviation from the average for each sensor. If any given sensor deviates from the average by more than a threshold amount, the sensor can be flagged as potentially faulty, in need of calibration, in need of inspection, or otherwise providing unreliable results. For example, in a surface condenser, an instrumentation check can be performed on cooling water inlet probes by considering the standard deviation of each probe from the average value. In another aspect (e.g., if there are only two sensors for a particular property), the absolute value of measurements from the sensors can be compared to each other to determine how well the sensors correlate, and the sensors can be similarly flagged if the absolute value of the difference exceeds a threshold amount.

Additionally, the sensors can be checked by comparing sensor data from different measured properties to determine if they are within an expected correlation. For example, in a surface condenser, the absolute values of the condenser saturated steam can be compared with the hotwell condensate temperature and/or the low pressure exhaust steam temperature (i.e., steam leaving the turbine) to ensure that the values are within a predetermined threshold. If the values differ by more than the threshold amount then one or more of the probes can be flagged as being aberrant.

The controller can be programmed to generate a report that is displayed on a display so that the operator of the heat exchanger can troubleshoot issues with the heat exchanger and take corrective action if needed. One example report is illustrated in connection with FIGS. 3A-3B. As can be seen in FIG. 3AB, the report 300 identifies an "Instrumentation Check" section 310 that provides the results of four separate instrumentation checks. In this case, the absolute back pressure probe check was determined to be aberrant and is flagged with a dashed border 315. Alternative flags or alarms can be used for any of the failed instrument checks, such as highlighting the aberrant results in a different color such as red. Data from each sensor that is used in the instrumentation check can also be displayed graphically in graphs 316, e.g., by showing the measurement data from each sensor over time. The report 300 identifies at least one likely outcome or diagnosis in a "Troubleshooting Check" section 320 based on evaluation of the operational properties with the rules matrix, as described above. The report also includes a "Key Performance Indicators" section 330 that can identify each of the operational parameters of the heat exchanger that is used in the rules matrix. Data relating to the key performance indicators can also be displayed graphically in graphs 336, e.g., by showing the value of each performance indicator over time, Additional information relating to the key performance indicators can be displayed, such as statistical analyses, trends, and predictive modeling of these parameters. As discussed above, each possible outcome/diagnosis can also be associated with additional display content that can be displayed as part of the report. This content may include, for example, the predetermined message explaining likely issues with the heat exchanger and recommendations for troubleshooting and correcting any problems.

The report can concisely communicate condenser issues to the operator of the heat exchanger, and provide reasoning explaining the diagnoses. This is unique since existing monitoring systems tend to only report raw sensed data or calculated parameters to communicate the current operating values of the heat exchanger. In contrast, the controller that is part of the system described herein can diagnose issues with the heat exchanger by identifying a likely source of a problem and can provide a report to the operator periodically or on-demand, for example.

In some embodiments, the controller displays the report or the likely diagnosis, and the operator is free to interpret the report and opt to take corrective measures as needed. In other embodiments, the controller can include control logic to automatically control the heat exchanger based on an identified likely diagnosis. For example, once the controller determines a likely outcome/diagnosis associated with the heat exchanger, it may be possible for the controller to automatically send signals to control equipment such as valves and pumps to take corrective action, e.g., by changing the flow rate of cooling water, changing an amount of chemical additive added to a water stream, etc. Accordingly, it may be possible for the controller to control the operation of the heat exchanger in real time by using one or more feedback loop mechanisms (e.g., as in a PM controller).

The systems, methods, and devices described above allow a heat exchanger to be automatically evaluated using online sensor measurements to provide an operator with a likely diagnosis for heat exchanger issues and/or to automatically control operation of the heat exchanger. The performance of the heat exchanger can therefore be evaluated based on the actual operating conditions of the heat exchanger (e.g., based on current duty, steam flow, cooling water flow, etc.) rather than on the design parameters of the heat exchanger.

And, using a rules matrix to diagnose and troubleshoot heat exchangers is a unique way to process raw heat exchanger data. It allows large quantities of raw data to be quickly processed to determine a likely diagnosis of the heat exchanger. In this regard, comparing a set of operating values with a predetermined set of values from the rules matrix can be processed much more quickly, as compared to a flow chart or decision tree, for example. Unlike a flow chart or decision tree, the rules engine does not need to sequentially follow each decision path to ascertain a likely outcome, and instead can compare large quantities of data with the rules matrix to quickly reach a likely diagnosis. The rules matrix can be programmed to address all likely diagnoses and combinations of data. The rules matrix is also much more flexible than a flow chart or decision tree, and enables the determination of a likely diagnosis even where some of the sensor inputs are not available, and allows for a diagnosis to be reached even there may not be an exact match of the operating values to the rules matrix. The rules matrix also allows for certain rules to be give relatively more or less weight in determining a likely diagnosis.

While the invention has been described in conjunction with the specific exemplary embodiments thereof, it is evident that many alternatives, modifications, and variations will be apparent to those skilled in the art. Accordingly, exemplary embodiments of the invention as set forth herein are intended to be illustrative, not limiting. There are changes that may be made without departing from the spirit and scope of the invention.

What is claimed is:

1. A system comprising:
   a heat exchanger that is configured to transfer heat between two or more process fluids;
   a plurality of sensors that are each configured to measure an operating property of the heat exchanger and transmit measurement information that is based on the measured operating property;
   a controller that is programmed to (i) evaluate the measurement information for a plurality of rules, wherein each of the plurality of rules compares a corresponding operating parameter of the heat exchanger that is based on the measurement information to a predetermined threshold value to thereby identify a set of operating values; (ii) compare the set of operating values to a rules matrix in which each of a plurality of possible diagnoses for the heat exchanger are associated with a corresponding set of predetermined values from a set of the plurality of rules; (iii) based on the comparison, determine at least one likely diagnosis for the heat exchanger from among the plurality of possible diagnoses; and (iv) cause information identifying the at least one likely diagnosis to be displayed on a display.

2. The system according to claim 1, wherein the plurality of sensors includes at least one sensor selected from a temperature sensor, an oxidation reduction potential (ORP) sensor, a pressure sensor, a turbidity sensor, a flow rate sensor, a conductivity sensor, a dissolved oxygen sensor, and an ion sensor.

3. The system according to claim 1, wherein the plurality of sensors includes (i) at least one sensor that is configured to measure a temperature of a cooling water inlet of the heat exchanger; and (ii) at least one sensor that is configured to measure a temperature of a cooling water outlet of the heat exchanger.

4. The system according to claim 1, wherein the heat exchanger is a condenser.

5. The system according to claim 4, wherein each of the plurality of sensors is configured to measure an operating property of the condenser that is selected from the group consisting of (i) temperature of cooling water entering the condenser; (ii) temperature of cooling water exiting the condenser; (iii) temperature of steam entering the condenser; (iv) back pressure of the condenser; (v) temperature of a hotwell of the condenser; (vi) cation conductivity of condensate of the condenser; (vii) dissolved oxygen concentration in the condensate; (viii) sodium concentration in the condensate; (ix) flow rate of the cooling water; (x) flow rate of the steam entering the condenser; (xi) ORP of the cooling water; (xii) pH of the cooling water; (xiii) turbidity of the cooling water; (xiv) rate of air removal of the condenser; (xv) cooling water pump current used; and (xvi) water box level.

6. The system according to claim 4, wherein the operating parameter in at least one of the plurality of rules is selected from the group consisting of (i) temperature rise (TR) of cooling water; (ii) terminal temperature difference (TTD) of the condenser; and (iii) differential pressure (DP) of the cooling water, and wherein in evaluating the measurement information, the controller calculates an operating value from the measurement information that corresponds to the operating parameter.

7. The system according to claim 4, wherein the condenser is part of a power generation facility.

8. The system according to claim 7, wherein the system further includes at least one second sensor that measures an operating property of another part of the power generation facility apart from the condenser, and wherein the plurality of rules further includes at least one rule that relates to the operating parameter of the another part of the power generation facility, and the controller is further configured to evaluate measurement information from the second sensor for the at least one rule to provide a value that is used as part of the set of operating values.

9. The system according to claim 8, wherein the at least one second sensor measures a water chemistry property from another part of the power generation facility apart from the condenser.

10. The system according to claim 1, wherein the controller is configured to evaluate the measurement information for at least 10 rules.

11. The system according to claim 1, wherein the corresponding set of predetermined values includes predetermined values for at least 5 rules.

12. The system according to claim 4, wherein the plurality of possible diagnoses in the rule matrix includes air inleakage of the condenser.

13. The system according to claim 4, wherein the plurality of possible diagnoses in the rule matrix includes air inleakage of the condenser, fouling of the condenser, leakage of the condenser, and a problem with a circulating pump.

14. The system according to claim 4, wherein the plurality of rules includes (i) a comparison of a TTD of the condenser with a threshold value; and (ii) a comparison of a TR of cooling water of the condenser with a threshold value.

15. The system according to claim 14, wherein the plurality of rules further includes (i) a comparison of cation conductivity of condensate of the condenser with a predetermined threshold value; (ii) a comparison of sodium ion concentration in the condensate of the condenser with a predetermined threshold value; and (iii) a comparison of dissolved oxygen concentration of the condensate with a predetermined threshold value.

16. The system according to claim 1, wherein the controller is configured to determine that one of the plurality of possible diagnoses in the rules matrix is a likely diagnosis for the heat exchanger if the set of operating values matches at least 80% of the set of predetermined values in the rules matrix that corresponds to the one of the plurality of possible diagnosis.

17. The system according to claim 1, wherein the system includes multiple sensors that measure the same operating property of the heat exchanger, and wherein the controller is further configured to evaluate the multiple sensors by comparing measurement information from each of the multiple sensors.

18. The system according to claim 17, wherein, based on comparing the measurement information of the multiple sensors, the controller is further configured to determine that at least one sensor of the multiple sensors is providing aberrant measurement information, and cause information to display on a display that indicates that the at least one sensor is providing aberrant measurement information.

19. The system according to claim 17, wherein the system includes at least three sensors that measure the same operating property of the heat exchanger.

20. The system according to claim 17, wherein the controller is configured to evaluate the multiple sensors by determining a standard deviation of the measurement information from each of the multiple sensors.

21. The system according to claim 1, wherein the controller is further configured to evaluate whether at least one of the plurality of sensors is aberrant by comparing measurement information from the at least one of the plurality of sensors to measurement information from at least one other sensor of the plurality of sensors.

22. The system according to claim 1, wherein each of the plurality of possible diagnoses are associated in a memory with a predetermined message, and the controller is further configured to cause the predetermined message that is associated with the at least one likely diagnosis to be displayed on a display.

23. The system according to claim 1, wherein the predetermined threshold value is determined empirically from the heat exchanger.

24. The system according to claim 1, wherein the set of operating values is a set of binary values, and the corresponding set of predetermined values is a set of predetermined binary values.

25. The method according to claim 1, wherein the set of operating values is a set of binary values, and the corresponding set of predetermined values is a set of predetermined binary values.

26. A method for evaluating a heat exchanger, the method comprising:

(i) measuring a plurality of operating properties of the heat exchanger with a plurality of sensors to provide measurement data;

(ii) using a controller, identifying a set of operating values by evaluating a plurality of rules with the measurement data, wherein each of the plurality of rules compares a corresponding operating parameter of the heat exchanger that is based on the measurement data with a predetermined threshold value;

(iii) using the controller, comparing the set of operating values to a rules matrix in which each of a plurality of possible diagnoses for the heat exchanger are associated with a corresponding set of predetermined values from a set of the plurality of rules; and (iv) based on the comparison, and using the controller, determining at least one likely diagnosis for the heat exchanger from among the plurality of possible diagnoses in the rules matrix, wherein the likely diagnosis corresponds to one of the plurality of possible diagnoses that is associated with a set of predetermined values that matches at least 80% of the set of operating values.

27. A non-transitory computer readable medium containing computer-executable instructions that, when executed, cause at least one processor to process measurement information from a plurality of sensors that measure a plurality of operating properties of a heat exchanger including steps of:

(i) identifying a set of operating values by evaluating a plurality of rules with the measurement information, wherein each of the plurality of rules compares a corresponding operating parameter of the heat exchanger that is based on the measurement information with a predetermined threshold value;

(ii) comparing the set of operating values to a rules matrix in which each of a plurality of possible diagnoses for the heat exchanger are associated with a corresponding set of predetermined values from a set of the plurality of rules; and (iii) based on the comparison, determining at least one likely diagnosis for the heat exchanger from among the plurality of possible diagnoses in the rules matrix.

* * * * *